United States Patent [19]
Kuznicki et al.

[11] Patent Number: 5,710,639
[45] Date of Patent: Jan. 20, 1998

[54] SCAN LINE COMPRESSED FACSIMILE COMMUNICATION SYSTEM

[76] Inventors: William Joseph Kuznicki, 3681 NW. 100th Ave., Coral Springs, Fla. 33065; Robert John Schwendeman, 590 SE. 10th Ave., Pompano Beach, Fla. 33060; Gregg Edward Rasor, 1164 SW. 23rd Ave., Boynton Beach, Fla. 33426

[21] Appl. No.: 591,066
[22] Filed: Jan. 25, 1996
[51] Int. Cl.$^6$ ............................ H04N 1/41
[52] U.S. Cl. ......................... 358/426; 358/261.1
[58] Field of Search ..................... 358/426, 427, 358/261.1–261.4, 430–431; 382/166, 232–233; 395/114, 888

[56] References Cited

U.S. PATENT DOCUMENTS

| | | | |
|---|---|---|---|
| 4,291,339 | 9/1981 | Ogawa et al. | 358/261.3 |
| 4,413,287 | 11/1983 | Torpie et al. | 358/261.1 |
| 5,057,937 | 10/1991 | Muramatsu et al. | 358/426 |
| 5,410,417 | 4/1995 | Kuznicki et al. | 358/426 |

Primary Examiner—Edward L. Coles, Sr.
Assistant Examiner—Stephen Brinich
Attorney, Agent, or Firm—Gregg Rasor

[57] ABSTRACT

A selective call receiver includes a receiver (103), a controller (105), and a display (113) for presenting a recovered source document. The receiver (103) provides a received paging message that was generated from the facsimile message of the original source document (208). The received paging message is interpreted and decoded by the controller (105). Using the display (113), a decoded scan line compressed document (1101) is presented in a format that substantially resembles the facsimile message of the original source document (1100).

54 Claims, 9 Drawing Sheets

FIG. 11

SCAN LINE COMPRESSED FACSIMILE COMMUNICATION SYSTEM

FIELD OF THE INVENTION

This invention relates in general to selective call communication systems and more particularly to a paging system for the transmission and reception of compressed facsimile data.

BACKGROUND OF THE INVENTION

Selective call communication (paging) systems typically comprise a radio frequency transmitter/encoder (base station) that is accessed via a link to the Public Switched Telephone Network (PSTN) and a radio receiver (e.g., a selective call receiver or the like) that has at least one unique call address associated therewith. Operationally, the selective call receiver receives and decodes information transmitted from the base station, the information having an address and possibly a data or voice message. When the selective call receiver detects its address, it typically alerts the user and presents any received information.

Contemporary paging systems employ messaging schemes that can deliver a voice, numeric, or alphanumeric message to a user. The majority of paging systems transmit address and message information using a protocol such as GSC (Motorola's Golay Sequential Code) or POCSAG (Great Britain's Post Office Code Standardisation Advisory Group). These protocol formats are well known to one of ordinary skill in the art of Paging systems. To originate a message or page, the base station or paging terminal is typically accessed via the PSTN from a rotary or dual-tone-multi-frequency (DTMF) telephone. As a voice message entry device, the telephone is acceptable but when data needs to be entered, an alternative means of entry is desirable. Alternative entry devices such as computer terminals or custom entry devices work well if the originator can convey their information to the user in a textual format. Presently, customer acceptance of these alternative entry devices has been lacking for reasons of expense and complexity. Regrettably, if the originator must convey a large amount of information to the user, existing paging systems and data transport protocols do not allow the transmission of either long textual messages or messages containing graphical data. Thus, for reasons associated with the data entry problem, most paging service providers do not provide alphanumeric paging message services.

In summary, there is a need for an information transmission system capable of delivering large amounts of data to a selected user and having a convenient means for entry of the data. In addition, there is a further need for a system that will allow information contained on a printed page to be transmitted to a paging device without over-extending the conventional selective call signaling infrastructure.

BRIEF DESCRIPTION OF THE DRAWINGS

FIG. 11 illustrates a first exemplary handwritten facsimile message compressed using the lossless Group III method, and the same exemplary handwritten facsimile message compressed using the scan line compression method, in accordance with the preferred embodiment of the present invention.

DESCRIPTION OF A PREFERRED EMBODIMENT

Figure 1:
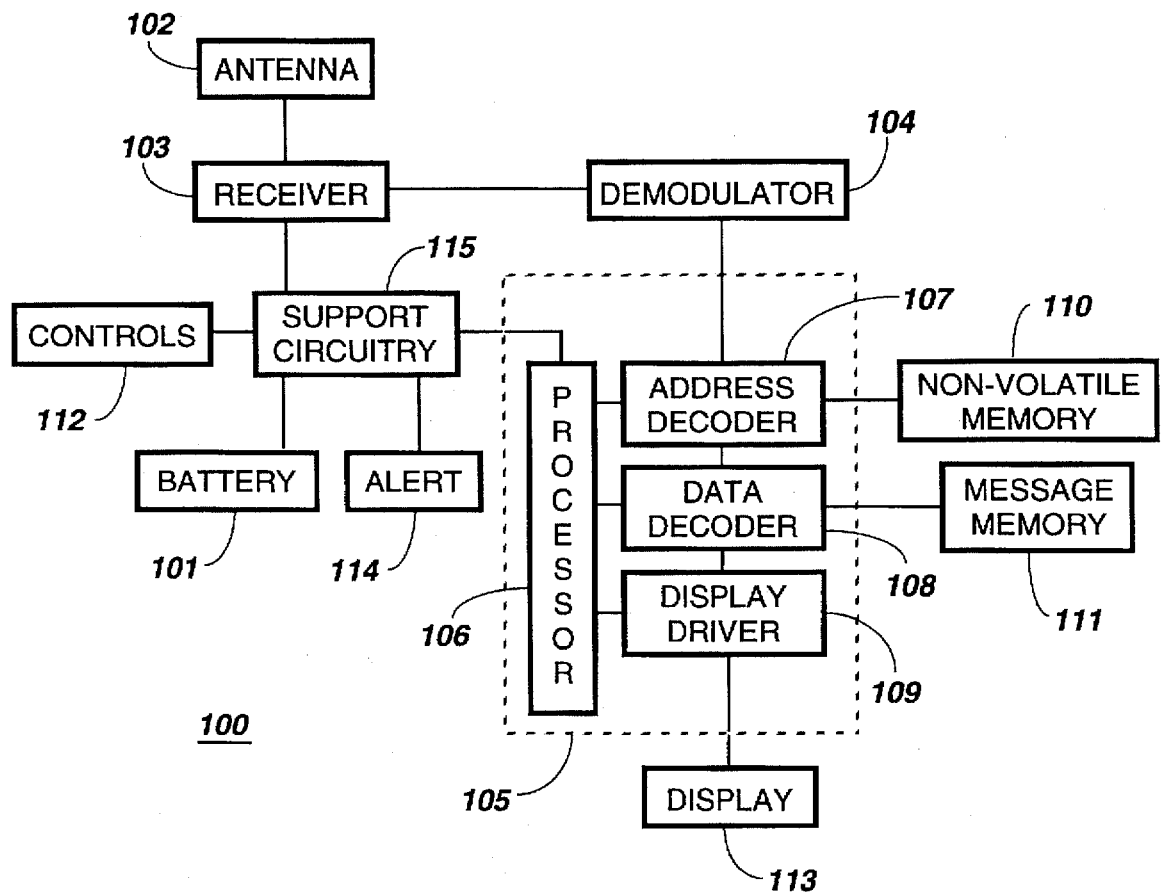
FIG. 1 is a block diagram of a selective call receiver in accordance with the preferred embodiment of the present invention.

Referring to FIG. 1, a battery 101 powered selective call receiver 100 operates to receive a signal via an antenna 102. A receiver 103 couples a received signal to a demodulator 104, which recovers any information present using conventional techniques. The recovered information is coupled to a controller 105 that interprets and decodes the recovered information. In the preferred embodiment, the controller 105 may comprise a processor 106, address 107 and data 108 decoders implemented in both hardware and software, and a display driver 109. More particularly, the processor 106 and associated message memory 111 are used in the preferred embodiment of the present invention to implement a scan line compressed facsimile decoder that decodes a scan line compressed facsimile document for presentation by the display 113 or the like. In this case, the scan line compressed facsimile decoder is implemented as software embodied in the non-volatile memory 110 that is executed in the processor 106. Alternatively, the processor 106 may include a dedicated hardware based decoder that implements the scan line compressed facsimile decoder.

The recovered information is checked by the address decoder 107, which comprises a signal processor that correlates a recovered address with a predetermined address or addresses stored in the selective call receiver's 100 non-volatile memory 110. The non-volatile memory 110 typically has a plurality of registers for storing a plurality of configuration words that characterize the operation of the selective call receiver. In determining the selection of the selective call receiver, the correlation is performed between a predetermined address associated with the selective call receiver and the recovered address. When the addresses correlate, the controller 105 couples message information to the message memory 111. In accordance with the recovered information, and settings associated with the user controls 112, the selective call receiver presents at least a portion of the message information, such as by a display 113, and signals the user via an audible, visual, or tactile alert 114 that a message has been received. The user may view the information presented on the display 113 by activating the appropriate controls 112. Alternatively, the selective call receiver 100 may transfer a received message or scan line compressed document to a peripheral device (not shown) external to the selective call receiver for storage, display, printing, or the like.

The support circuit 115 preferably comprises a conventional signal multiplexing integrated circuit, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to provide the selective call receiver as requested by the customer.

Figure 2:
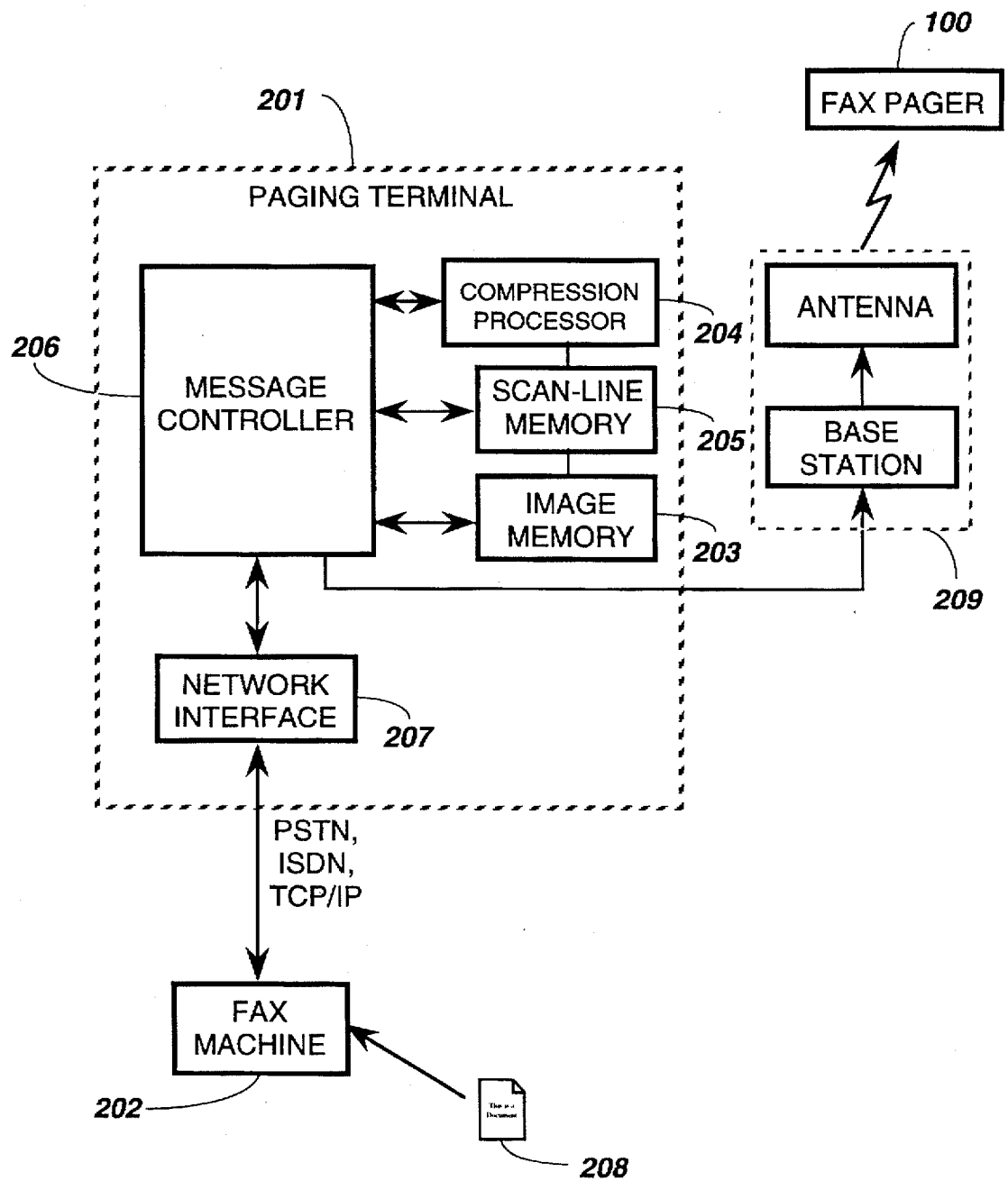
FIG. 2 is a block diagram of a selective call information signaling system in accordance with the preferred embodiment of the present invention.
Figure 3:
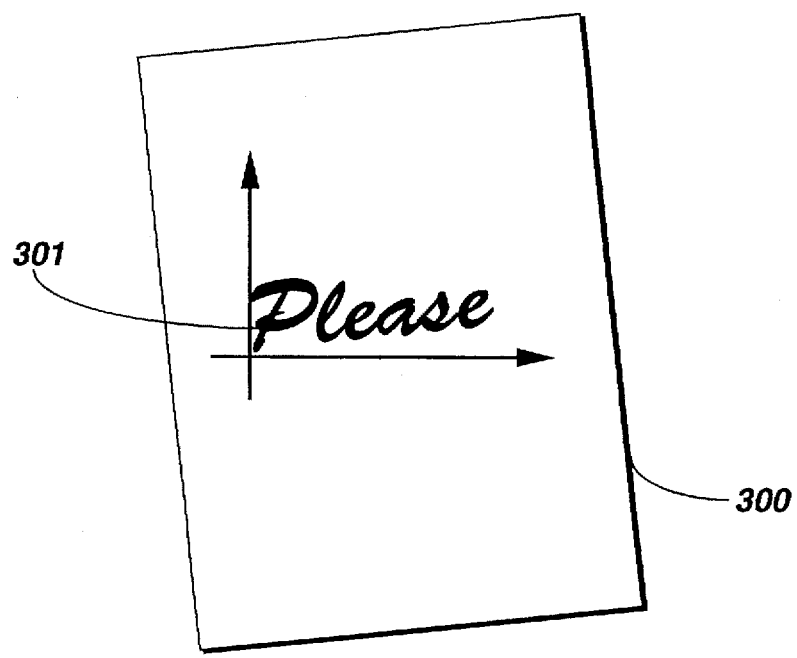
FIG. 3 illustrates a typical message that may be sent via the selective call communication system of FIG. 2.

Referring to FIG. 2, the block diagram illustrates a selective call information signaling system in accordance with the preferred embodiment of the present invention. A source document 208 as shown in FIG. 3 is read (scanned) by a FAX machine 202 that quantizes the image. The FAX machine 202 need not be located at the same physical site as a paging terminal 201, and in fact can be replaced by a number of devices such as a computer, a conventional document scanner, or possibly a dedicated message entry device, each being capable of communicating at least one FAX message to the paging terminal 201 via a network interface 207. The paging terminal 201 operates to receive conventional CCITT (Consultative Committee on International Telegraph and Telephone) Group III and IV FAX transmissions originated from the FAX machine 202 and associates each FAX message with at least one selective call address (or cap-code) selected by an originator as a destination for the FAX message.

The compression processor 204 operates on a virtual copy of the received quantized data. Preferably, the compression processor 204 is implemented using a computer based architecture such as a general purpose microprocessor or the like. Alternatively, the compression processor 204 may be implemented using a reduced instruction set computer (RISC), digital signal processor (DSP), or possibly in dedicated signal processing hardware. A message controller 206 acts not only to arbitrate the reception and encoding of paging messages, but also to control a paging base station 209.

Transmission of a message using the scan line compression technique will always yield a significant improvement over transmission carried out using strict 8 bit binary data or standard Group III facsimile coding. As an example, assume a scan discard ratio of 9 (e.g., "throw away" 9 out of every 10 scan lines), and a run-length encoding benefit (compression advantage) of 10:1 for each line. A typical Group III message size would yield 20 Kbytes of facsimile data, while the exemplary scan line compressed message size is reduced to approximately 1100 bytes of data, taking only 0.92 seconds to transmit at 1200 baud (approximately 1100 bytes of data at 10 bits per symbol). Even considering a lower scan discard ratio of say 4 (throw away 4 out of every 5 scan lines), the resulting message size is approximately 2300 bytes of data and takes only 1.92 seconds to transmit. The techniques involved in this example will be more fully discussed later.

When the preceding examples are analyzed using a typical over-the-air coding scheme such as Motorola's™ high speed FLEX™ protocol, GSC (Motorola's Golay Sequential Code), or POCSAG (Great Britain's Post Office Code Standardisation Advisory Group), the overhead increases only by the amount of parity bits associated with the code selected, and thus the total transmission time is increased by the ratio of the coded data to the un-coded data. In the case of a conventional (23,12) code (23 total bits of which 11 are parity bits and 12 are data bits), one would expect to see an increase in time of approximately 92% (e.g., 1.77 seconds for the scan line compressed message as compared to a best case of 19.2 seconds for Group III FAX data). This data increase due to coding overhead is typical among conventional paging protocols.

One of ordinary skill in the art will realize that the data rate, word and symbol length may be altered to best fit the desired system design goals without deviating from the gist of the present invention. For example, on may adapt the baud rate to vary dynamically between 1600, 3200, or 6400 symbols per second as in a FLEX™ paging system, to accommodate information messages of differing density without impacting the overall system throughput. Similarly, more efficient linear or non-linear coding schemes may be piggy-backed on top of the basic scan line compression method to further enhance the advantages realized by the instant invention.

The paging terminal 201 may be alternatively referred to as a facsimile message input processor. For purposes of this invention, the paging terminal 201 when operating as the facsimile message input processor, is capable of receiving Group IV facsimile transmissions via the network interface 207. At least one input is included to accept Group III transmissions at e.g., at 4,800, 9,600 or higher baud rates, via the public switched telephone network (PSTN), as well as Group IV transmissions via a high speed data network such as the emerging Integrated Services Digital Network (ISDN). The network interface 207 can be expanded to include hardware that accommodates high speed coaxial or optical communication to local or wide area networked computer systems as well as ISDN devices. This gives an added dimension of flexibility for the user by allowing the origination of a FAX directly from any compatible device on the network.

As suggested in the earlier analysis, once the document 208 has been scanned and processed by the paging terminal 201, the resulting coded data is further encoded using a conventional signaling protocol (e.g., FLEX™, POCSAG, GSC, or the like) suitable for the transmission of information via a radio frequency link. As stated before, these protocols add error detection and correction capabilities to the information link, thus insuring the delivery of error free data to the paging user. The paging terminal 201 may also serve to control the transmitter 209 (or transmitters in a multi-cast system) and generate a queue for incoming and outgoing paging messages. Furthermore, specific sections of received facsimile messages for re-transmission can be adaptively scaled, coded, and re-quantized by the paging terminal 201 to meet the requirements of the display device 113 coupled to the selective call receiver 100.

When the paging terminal 201 has completed processing the incoming message, the transmitter 209 broadcasts a signal modulated with data representing a selective call address and the message. The selective call receiver 100 detects its address, recovers the message, alerts the user, and makes the received information available for presentation to the user in a variety of formats including but not limited to characters, graphics, and audio.

Some specialized applications that can be accommodated by the preferred embodiment of the selective call information signaling system are electronic mail, storage, retrieval, and forwarding of facsimile messages, and integration of text with graphics into a compound document architecture compatible with industry standard computer productivity software applications. The following examples will further illustrate many uses for the present invention in both one- and two-way information transmission systems.

The following examples illustrate several situations where a conventional facsimile message is received by the paging terminal 201 and processed by the scan line compressor for transmission. First, consider that a standard Group III FAX has a "fine" resolution of approximately 200 by 200 dots per inch (dpi) or approximately 80 dots per centimeter. Assuming an exemplary message containing 938 horizontal scan lines each having an average of 20 black to white transitions per line on an A4 page size (approximately 21.0 by 29.7 cm), the binary quantization of that message may contain approximately nine hundred thousand (900,000) bits of data, or approximately 90K bytes, without any compression applied. To transmit this message, assuming a byte oriented serial protocol with no error correction and no data compression would take around one minute and fifteen seconds at a typical paging protocol speed of 1200 baud (1 baud being defined as 1 ten bit symbol having 8 information bits, 1 start bit, and 1 stop bit, per second). This transmission time of over one minute per page is impractical in terms of the economics of using a state of the art radio frequency paging channel.

If the exemplary message is sent using a facsimile (FAX) machine operating per the CCITT Facsimile Standard for Group III facsimile, it is first encoded using a coding scheme known as the modified Huffman code. The modified Huffman code uses a standard Huffman code in conjunction with a modified READ (Relative Element Addressing Designate) code.

Standard Huffman coding performs a search of n bit data words and typically uses a predetermined look-up table to encode "commonly" repeated sequences with words (digital words, not written or spoken words) having less bits than the original data word. Variations of the standard Huffman code may improve coding efficiency by forming a dynamic encoding table on the basis of the statistical occurrence of a pattern within the data stream being analyzed for encoding.

The Modified READ code is a line-by-line scheme in which the position of each changing element on the coding line is coded with respect to either the position of a corresponding changing element on the reference line, which lies immediately above the coding line, or with respect to the preceding changing element on the coding line. The two modes in the modified READ code are vertical and horizontal or passing modes. Vertical mode coding uses only one bit to indicate the situation when a black pel (picture element) runs of the coding line start directly under a black pel run of the reference line. If the changing pel pairs are not within three (3) pels, then either horizontal or passing mode coding is used. After the line has been coded, it becomes the reference line for the next line. Since each coded line becomes the reference line for the next line, the fact that a single error can propagate over several lines means that this method of two-dimensional coding is vulnerable to repetitive transmission errors. Therefore, Group III facsimile uses the modified Huffman coding periodically to prevent an error pattern from developing. At a resolution of 200 by 200 dpi (80 dots per centimeter), every fourth line is coded with the modified Huffman coding and the rest with the modified READ code to prevent errors and decrease transmission time.

Modified Huffman coding takes into account only the horizontal dependencies between pels on the same scan line. Operationally, modified Huffman coding works as described in the following text. Consider an A4 document that has 1728 pels/line and 3.85 lines/mm. Each scan line is regarded as sequence of alternating black and white runs. All scan lines are assumed to start with a white run length of zero or more bits. The white and black run lengths of 0 to 63 bits are represented by terminating code words and white and black run lengths of 64 to 1728 bits are represented by make-up code words followed by terminating code words. Each code line is then followed by the end-of-line code word that is a twelve bit code which cannot be duplicated by any type or combination of code words. The modified Huffman code described is the easiest coding scheme to implement and yields a maximum compression ratio or 20:1, or an average compression ratio nearing 10:1.

Applying the modified Huffman code discussed above and assuming a worst case compression ratio of 10:1, the sample message would quantize to approximately 9 Kbytes of data after compression, yielding a transmission time of 7.5 seconds at 1200 baud (assuming 20 transitions per text information line). The message length (time wise) is still prohibitive since 7.5 seconds of air time may represent the transmission of eighty or more numeric paging messages in a modern paging system. In a high performance paging system utilizing a protocol such as Motorola FLEX™, operating at 6400 bits per second, almost three hundred pages can be sent in 7.5 seconds. Obviously, even in systems using high data rates, a service provider may lose revenue if air time formerly dedicated to tone only, numeric, or alphanumeric pagers is used to transmit conventional fax messages. Consequently, an improved method and apparatus is needed to reduce the transmitted data to an amount deemed reasonable with respect to the paging air time consumed. The present invention includes techniques that meet this requirement, and may be applied to handwritten messages and large, simple graphics, resulting in a significant reduction in required air time. Thus, the transmission of facsimile messages is made compatible with normal high volume paging services on a given channel.

Now considering the present invention, in a first embodiment, a user wanting to send a FAX to a subscriber (a person or device having a selective call FAX receiver) would call the subscriber's paging service provider using a conventional telephone and enter the user's cap-code (a unique number assigned by the paging service provider that corresponds to the actual coded address of the pager). The paging service provider maintains a list of FAX capable capcodes, and upon receiving the entered cap-code, will initiate a procedure to receive a conventional facsimile message. The user would then put the conventional facsimile machine 202 on-line, load, and transmit their document to the paging terminal 201 at the paging service provider. After receipt of the FAX message, the paging terminal 201 will encode and transmit a paging message to the targeted subscriber using the unique encoding methods discussed herein.

In a second embodiment, a user wanting to send a FAX to a subscriber uses a conventional facsimile machine that has a feature allowing the storage of a list of predetermined phone numbers. In this embodiment, a FAX message can be originated either manually by keying in a phone number or by recalling the phone number from a memory in the originating FAX machine. The user's cap-code may be represented by an alias or nickname that points to a predetermined memory location containing the cap-code and the phone number of the paging service provider. When originating a FAX message, the person sending the message would recall (or dial) the paging service's number and enter (or the machine would automatically, upon establishing a connection with the service) the user's cap-code. After successfully connecting with the paging service provider, the facsimile machine would transmit the document to the paging terminal 201 for storage, processing, and retransmission to the destination selective call receiver.

In a third embodiment, the FAX machine 202 is closely coupled to the paging terminal 201 as shown in FIG. 2. This embodiment includes all the capabilities discussed in reference to the first two embodiments and further improves on their performance by not requiring a PSTN connection to originate a paging request. In this embodiment, the facsimile message input processor is an integral part of the paging terminal 201. Alternatively, the facsimile message input processor may be embodied as a separate device having attributes such as a processor, electronic memory, and network capability such as discussed in reference to the paging terminal 201. In such an embodiment, the facsimile message input processor can be connected to a paging terminal 201 via a high speed local or wide area network (e.g., RS-232, IEEE 802.3, or the like), ISDN (Integrated Services Digital Network) line, or possibly a wireless optical or radio frequency connection, thus resulting in extremely high message throughput.

Alternatively, an electronic information processing device such as a conventional desktop, laptop, or palmtop computer may be used in conjunction with the previous embodiments to create a facsimile message from a stored electronic document, and automatically transmit the facsimile message to a paging service subscriber at the user's command.

As discussed earlier, after the paging terminal 201 receives and stores the FAX message in an image memory 203, the received FAX message data is processed by the compression processor 204. The compression processor 204 creates a virtual copy of the received quantized data in scan line memory 205. At this point, the compression processor 204 is working on the received decoded image representing the original raw quantized data. The compression processor 204 first computes a "white space ratio" for the complete scanned image using a white space processor that performs a virtual rotation (up to ±25 degrees from horizontal) of the quantized data. The preferred embodiment of this processing procedure is described in U.S. Pat. No. 5,410,417 entitled "Method And Apparatus For Correcting An Angle Of An Optical Image For Improving The Efficiency Of Facsimile Encoding Of The Image" and assigned to Motorola, Inc. Additionally, the quantized image may be rotated 90 degrees and then processed by the white space processor. This option would theoretically yield better results on quantized data that was "scanned" and organized in a vertical format, rather than a horizontal format such as this page. The resulting white space ratio that has been determined is a measure of the amount of null information content in at least one virtual horizontal scan line. A maximum value of the white space ratio corresponds to the angle at which the quantized data is most compressible, e.g., an optimally rotated image. Consequently, once the compression processor 204 finds the maximum value of the white space ratio and its corresponding angle of rotation (saved as a rotation factor) using the white space processor, it proceeds to find the text or object height and determine a suitable scan discard ratio. This procedure will be more fully discussed later.

Although most of the conventional coding techniques mentioned so far are present in current facsimile coding standards, their application to the quantized data is rigidly specified, and no deviations are permitted. To allow deviations in a standard such as used in Group III facsimile would result in gross incompatibilities between systems. However, vast improvements can be gained by using lossy compression schemes that intelligently process the information based on the level of perception required by a user to accurately comprehend received data. Consequently, the scan line compression method described in this invention makes use of the existing standards when possible, while intelligently processing the information based on the level of perception required by a user to accurately comprehend received data.

Additionally, one must consider the many lossy compression schemes available for coding images. One such compression scheme is JPEG (Joint Photographic Experts Group), a three-dimensional chrominance and luminance color compression scheme. Although lossy compression schemes are efficient when used to code color images, they prove to be unusable when dealing with monochromatic data such as present in a Group III facsimile image. However, the present invention is equally applicable to monochromatic and color images and text, as the basis for compression lies not in the frequency and vector content, but in the image density and an effective system loading factor f which determines the scan discard ratio or line skip factor.

Regarding the effective system loading factor f, an information service operator allowing FAX paging is faced with the problem of coding and transmitting an enormous amount of data such as transmitted under ordinary Group III fax transmission specifications. By applying scan line compression techniques to the quantized data represented by a received FAX message, the amount of data transmitted to a selective call receiver can typically be reduced by a factor of 5 or more, as compared to ordinary Group III fax. To further expand on this claim, consider the following example. There are approximately 20000 pels (picture elements) per square inch (2.54 cm$^2$) in a fine resolution Group III FAX message. Assuming this, a U.S. standard letter size document (8"×10" or 20.32×25.4 cm) requires approximately 3,200,000 pels of information for lossless quantization. As discussed earlier, using a Group III fax protocol this information may be compressed by about a factor of 10. From the standpoint of a wireless service provider, the air-time required to transmit such a message is incompatible with conventional services offered on a state of the art high volume paging channel. However, as will be illustrated in the following discussion, the scanned data in a representative full size text page may be easily transmitted, using the scan line compression technique, in less than half the time required for a conventional Group III fax message.

Referring to FIG. 3, the illustration shows a typical received facsimile document 300 that can be quantized, conditioned, and transmitted in accordance with the present invention using the selective call communication system discussed in reference to FIG. 2. This exemplary message comprises handwritten text or letters 301 that can be recognized using the mapping feature as performed by the paging terminal 201 in FIG. 2. The message may be entered into the paging terminal 201 using at least one of the following methods: scanning via the conventional facsimile (FAX) machine 202 integrated with the paging terminal 201, scanning via a remote conventional facsimile machine and transmitting the resulting Group III or Group IV FAX to the paging terminal 201 via a PSTN connection, transmitting a compound architecture document (or simple document) from a local or remote computer to the paging terminal 201 via a PSTN connection using a conventional modem, or possibly by recalling a predetermined message from a storage device coupled to the paging terminal 201 for transmission to a selected user or group of users.

Figure 4:
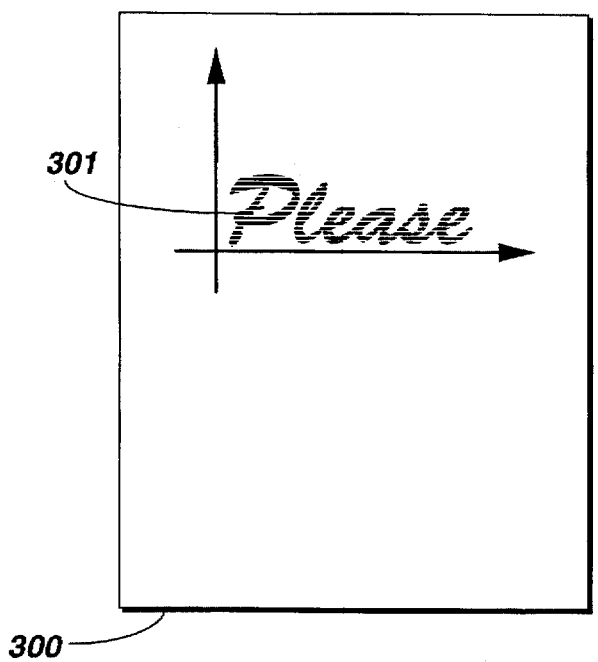
FIG. 4 illustrates a virtual position of the typical message of FIG. 3 after quantization and rotation to find an optimal white space ratio in accordance with the preferred embodiment present invention.

Referring to FIG. 4, when the received facsimile document 300 has been entered, the paging terminal 201 begins processing. The document 300 is first rotated to achieve the "most white" per scan line. As stated earlier, the document's virtual image may be rotated to compensate for unwanted slant or tilt up to ±25° from normal, using the maximal white point (or inverse black point) as a reference for the point of rotation. Since in this example we are dealing predominantly with handwritten messaging, one can simplify the processing of such data based on similar characteristics between handwritten messages.

The majority of written notes will typically have some degree of slant or tilting of the characters according to the writer's position and dominant writing hand. Additionally, since lined paper may not always be available to a writer, a second slant or tilt varying from line to line may be introduced. Both of these factors are effectively compensated for by the scan line processor.

To determine the text or object height, the quantized, optimally rotated document is systematically searched from top to bottom or vice-versa. In this search, geometric areas are identified on the virtual page that correspond with black major and white major regions. These black and white major regions are analogous to the areas of the page which you are reading that contain either printed text, objects, graphics, etc. or "white space" as between the lines. Once the major black areas have been identified, an average of the height in pixels (or any other normalized scan unit representing the discrete quantized data contained in the virtual image) is computed by summing all of the heights associated with the identified major black areas and dividing the sum by the number of black areas. Using text as an example, this average height corresponds to the average maximum height of capitalized characters. After determining the average maximum height, the black major regions are re-scanned to determine whether there is a significant difference in density across their respective heights. For example, if a particular black major region is scanned from top to bottom and the result shows that the top one-third and bottom one-third each have a density of 10%, and the middle one-third has a density of 80% (0% corresponding to all white and 100% corresponding to all black), one can be fairly sure that the top corresponds with capital letters or lower case ascenders and the bottom corresponds with lower case decenders. Accordingly, a density factor can be determined for the particular black major region, the density factor being the sum of the densities in each horizontal line weighted over the height of the particular black major region. The density factor is defined by the following relation:

$$DF_n = \sum_{j=1}^{k} D_j$$

where $D_j$ represents a density of the jth sub-region in the at least one of the first and second information regions, and k is the total number of sub-regions in the at least one of the first and second information regions represented in this example by the nth black major region. The sub-regions are clearly identified in FIG. 5 with their corresponding sub-densities ∂. This density factor represents the percentage of black present in a particular black major region, thus serving as an indication of the unprocessed quantized information content of that region. For example, a density factor of 1.0 would correspond to the particular black major region being all black, while a density factor of 0.3 would correspond to the particular black major region being only 30% black.

After computing the density factor for each black major region, an effective or normalized density factor may be determined from the weighted sum of the black major region density factors as follows:

$$DF_{eff} = l_{avg} \sum_{n=1}^{m} \frac{DF_n}{l_n}$$

where $DF_n$ is the density factor of the nth black major region, $l_n$ is the number of scan lines in the nth black major region, $l_{avg}$ is the average number of scan lines (or height) in the black major regions, and m is the total number of black major regions. This effective or normalized density factor intentionally over estimates the percentage of information contained in the quantized sample to account for anomalous errors due to the finite nature of real optical quantization systems. However, the present invention can successfully use a similar density factor that accounts for only the actual average black major region density without appreciable loss of either resolution or compression advantage.

Figure 5:
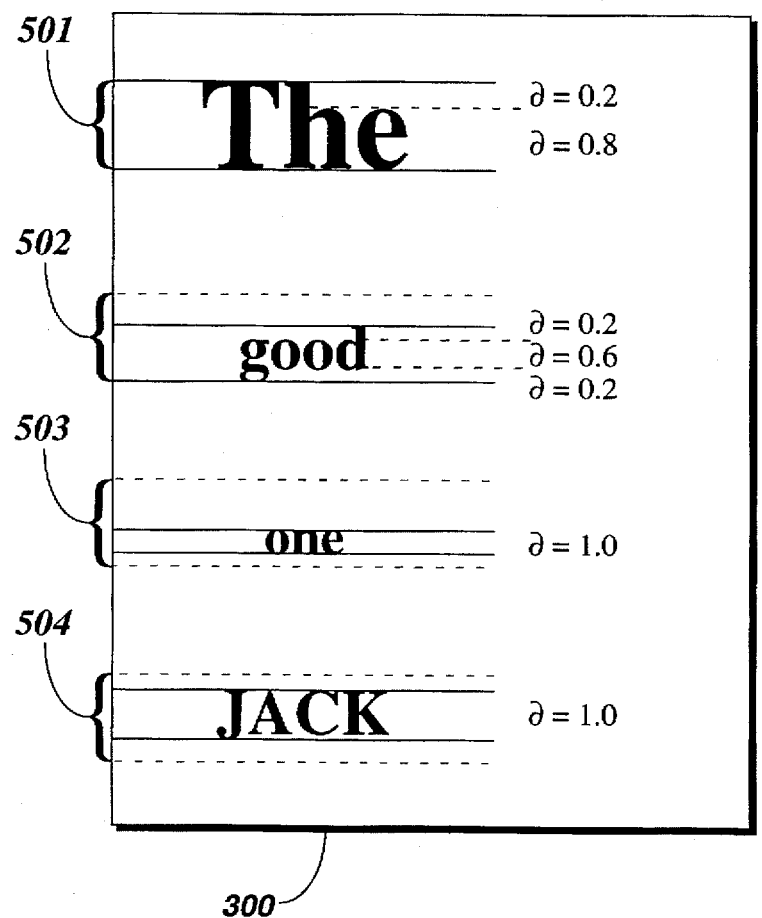
FIG. 5 illustrates several text blocks with differing heights and densities, all originally sampled in accordance with the Group III high resolution mode.

Referring to FIG. 5, the illustration shows an example of several text blocks with differing heights and densities, all originally sampled in accordance with the Group III fine resolution mode. In the first line representing a first black major region 501, the text "The" is printed using a 24 point typeface having a height of approximately 65 scan lines. The second line 502 representing a second black major region contains the text "good" printed using a 12 point typeface having a height of approximately 32 scan lines. The third line 503 representing a third black major region contains the text "one" printed using a 10 point typeface having a height of approximately 27 scan lines. Finally, the fourth line 504 representing a fourth black major region contains the text "HELLO" printed using a 12 point typeface having a height of approximately 32 scan lines. The average height of these four black major regions is 39 scan lines (65+32+27+32)/4. By applying equations [1] and [2], the density factors are calculated as $D_1=0.13$, $D_2=0.13$, $D_3=0.15$, and $D_4=0.20$, and the effective or normalized density is $D_{eff}=0.17$. Note that the effective density may be used as a figure of merit that indicates approximately 17% of the information contained in this example represents a first binary state, while the remaining 83% represents a second binary state. This is important since statistically, data that results in an effective density above 0.5 might be better compressed using an inverse coding algorithm, e.g., one that identifies white major regions instead of black major regions. Moreover, as the effective density increases, the use of run-length coding techniques may become more effective in coding horizontal lines, as opposed to classical token based schemes such as LZ77, LZ78, Lempel-Ziv-Huffman coding, or the like.

The lower case letters shown may be identified as residing in those areas characterized by high image density, such as shown in the second line 502 representing a second black major region and the third line 503 representing a third black major region. Note however, that the fourth line 504 representing a fourth black major region has an average density exceeding the first three, and should be identified as an all upper case region. Alternatively, when quantized data representing a handwritten note is scanned to determine the text height, capital letters typically present the largest distance between mostly white lines. Lower case letters may be estimated by the height at which density per scan line increases as the scan travels down the text.

Regardless of the text or objects contained in a selected region, the density determination will allow optimal characterization of the information contained in the original source document, thus resulting in a legible reconstruction from the coded scan line compressed data.

Figure 6:
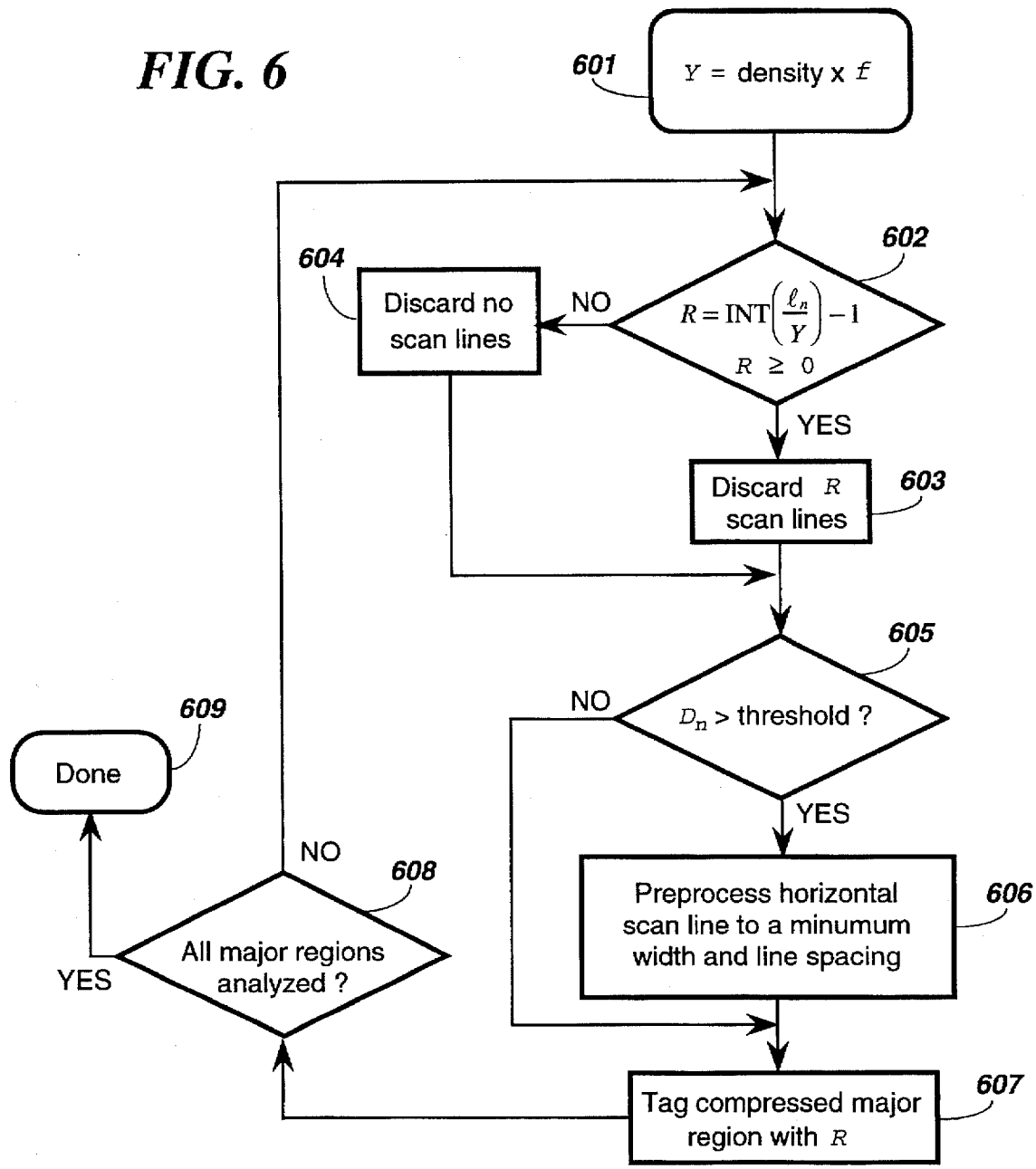
FIG. 6 is a flow diagram illustrating the encoding of a typical message by a paging terminal in accordance with the preferred embodiment of the present invention.

Referring to FIG. 6, the scan discard ratio is computed as follows. First, a vertical or Y dimension limit is selected corresponding with the vertical line density (number of scan lines) associated with the quantized image of the source document multiplied by a system loading factor f in percent 601. As stated above, since the high density areas in an identified black major region regions typically correspond with the body of lower case letters or lines containing all upper case letters, this may be used as the basis for the vertical dimension limit Y. By example, in low resolution Group III fax having a messaging density of 100 vertical lines per inch, (40 lines/cm), set this Y dimension limit to 100×10%=10. Second, the scan discard ratio is computed as:

$$R = INT\left(\frac{l_n}{Y}\right) - 1 \text{ lines}, R \geq 0.$$

This factor represents the number of scan lines that may be discarded 603 out of $l_n$ total scan lines in each identified major black region having similar characteristics 602. However, if the scan discard ratio is less than or equal to zero, no lines should be discarded 604 since a loss of information and intelligibility may result. For example, if the scan line height $l_1$ is determined to be 120 pels, R is calculated as 11 (120/10)−1, and 11 scan lines out of each 12 may be discarded in this region, yielding a compression ratio of 12:1, or one out of every 12 lines being transmitted.

If less compression is desired, the system loading factor f may be increased, resulting in a Y dimension limit such as 20 (100×0.2). This increase in the loading factor effectively causes the number of scan lines per identified major black region to be compared against a larger Y dimension limit, thus yielding less image compression and higher image resolution. Note that when a system loading factor of 100% is chosen, or when the height of an identified major black region meets or exceeds the Y dimension limit, no scan lines are deleted in that particular major black region.

Additionally, the density factor $DF_n$ is used in selecting either a standard coding procedure when the density factor $DF_n$ does not exceed a predetermined threshold, e.g., 0.5 or the like. The standard coding procedure comprises calculating a scan discard ratio R and discarding and appropriate number of scan lines.

The threshold of the density factor $DF_n$ is selected to insure no significant loss of messaging character intelligibility due to an over estimated scan discard ratio consequently, when the density factor $DF_n$ indicates selection of an alternate coding procedure 605, the standard coding is performed, and additionally, all horizontal lines are preprocessed 606 to be a minimum of P=($l_{avg}$−1)/5 pels wide, effectively fattening the line widths, and a minimum of ($l_{avg}$−1)/2 pels above and below each horizontal line.

Once the quantized message data is coded using the scan line compression procedure, it must be "tagged" by the paging system as a scan line compressed event. Consequently, a scan line event codeword is added for each compressed major region 607. The scan line compression factor or scan discard ratio R is contained in the scan line event codeword and must be transmitted in conjunction with each major region compressed using scan line compression as this number is essential for proper decoding of the compressed message.

After completing the analysis and compression of all identified major regions 608, 609, the remaining regions or "white space" (actually all regions containing like data) are conventionally coded using procedures such as run-length coding, Huffman coding, or the like.

When the complete source document has been coded, the resulting data may be reconstructed in a number of ways. The method selected should accommodate the reconstruction device (e.g., selective call receiver, paper fax machine, etc.) such that a message may be monitored while being received.

An example of interleaved document reconstruction can be seen in the reception of a CompuServe™ GIF™ (graphics interchange format) image in the interleaved mode. When a GIF™ image is received, the first data set includes lines at or near the extreme top and bottom of the image and selected lines in-between, the lines extending the width of the image, such that a low resolution, partially intelligible picture is constructed during early reception. As successive interleaved data sets are received, the image becomes more and more intelligible, filling in the intermediate blanks lines until the complete image has been received. Similarly, scan line compressed images may be transmitted using interleaved methods, yielding similar advantages.

By adapting the procedure discussed above to scan line compressed images, a portable information receiver with a display device (e.g., an LCD display or the like) can be used to quickly recognize an incoming graphical image.

Alternatively, the scan line compressed regions may be interleaved with the remaining regions (e.g., white space) so that the document may be transmitted in a sequence from top to bottom, right to left, or vice-versa. If the message is serially assembled from top to bottom, it may be transmitted in a manner similar to conventional facsimile messaging. This would allow a receiving device with hard copy capability to print the message in real time without buffering the image until reception is completed.

Figure 7:
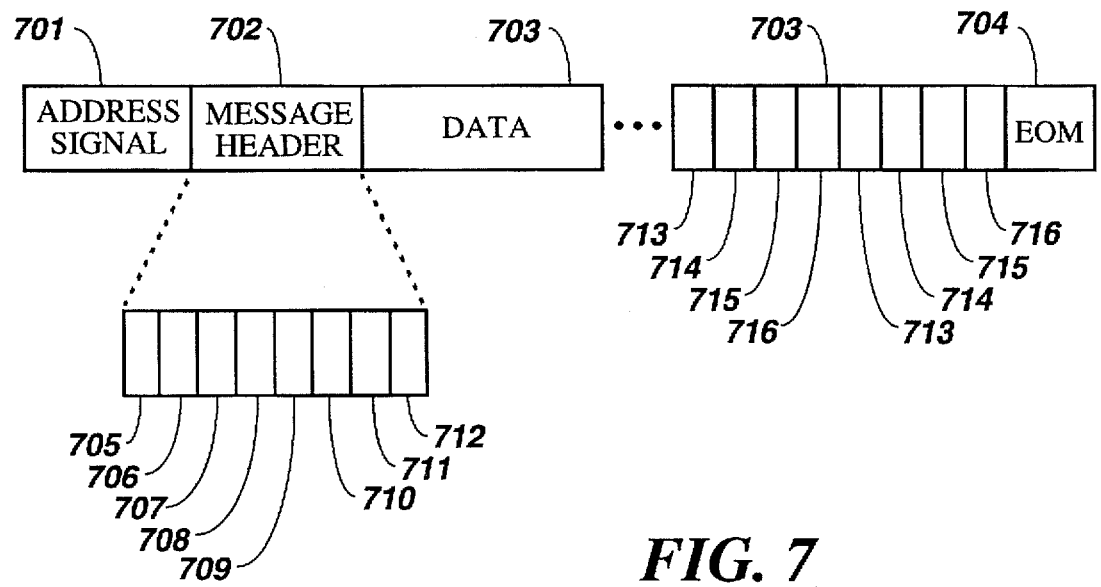
FIG. 7 is a protocol diagram of a selective call signaling format suitable for use in accordance with the present invention.

Referring to FIG. 7, the illustration shows a signaling protocol for addressing and transmitting facsimile data to a selective call receiver in accordance with the preferred embodiment. A FAX paging message packet (scan line compressed document) comprises a selective call address 701, an optional message header 702, a data block 703 or facsimile message having, for example, encoded scan line compressed, Group III, or Group IV facsimile data, and an optional end-of-message flag 704. The end-of-message flag 704 may be omitted without compromising the integrity of this signaling format if the message length is transmitted in the message header. The address signal 701 comprises a conventional selective call address. The optional message header 702 may contain information such as the location of subsequent data blocks in a vectored, interleaved messaging system 705, possibly an optional encryption type for use in a secure FAX messaging system 706, an optional facsimile protocol identifier 707, an optional data format type identifier 708, an optional data block length 709, an optional source document origination identifier 710, and optional rotation factor 711, or an optional source document dispatch time stamp 712.

Following the message header 702 is the data block 703 containing the coded facsimile data. This embodiment can be used in conjunction with a conventional FAX machine that implements scan line compression decoding, to receive FAX messages via a wireless data channel. Furthermore, when used in conjunction with a personal computer or the like (e.g., a desktop, laptop, or palmtop computer, or personal digital organizer), the selective call receiver as illustrated in FIG. 1 can couple the received FAX message data to the computer for storage in a file, thus allowing the user to have an archive of the received FAX message. Since the received FAX message data, once decoded, is unaltered from its native transmission format, conventional facsimile data manipulation hardware and software can be used to obtain a hardcopy of the received FAX.

As discussed earlier in reference to FIG. 6, the data block of the scan line compressed message contains the scan line compressed facsimile data comprising scan line event codewords for each scan line compressed region 713, associated scan line compressed major regions 714, run-length or similar codewords corresponding with compressed remaining regions 715, and associated compressed remaining regions 716. The preceding data may assembled in any one of several ways (e.g., serial interleave, overlap interleave, etc.) as identified by the message header 702.

In summary, a selective call address 701 that possibly contains or points to an address or data vector (not shown), and message header 702 should be included with each complete scan line compressed message to identify the destination (selective call receiver, etc.), allow message vectoring and fragmentation if necessary, and uniquely identify the source and dispatch time of the message. Altogether, the elements included with the scan line compressed message will allow proper reception and decoding of the scan line compressed message by a suitably equipped selective call receiver.

More particularly, the scan line compressed message in data block 703 can be transmitted to a selective call receiver in several other ways. First, as with conventional facsimile systems, the message can be transmitted line by line, making use of the scan discard ratio to delete or skip R lines between transmitted scan lines. This method allows the addition of conventional Group III coding or the like on top of the scan line compressed data, potentially yielding even higher compression ratios. Second, the complete scan line compressed message may be block encoded as a binary representation of a scan line based bitmapped image that is subsequently decoded by a scan line compression/decompression capable selective call receiver. This method may yield better error protection, and is directly compatible with conventional paging codes such as POCSAG or Motorola's™ FLEX™ family of paging protocols. In each case, the scan line compressed data should either include or be followed by a stop or end of data flag to indicate the end of a particular message transmission. This insures that when a scan line compressed message is sent using an interleaved protocol, where message fragmentation is possible, a message complete status can be determined when the last fragment is received. Similarly, in a non-interleaved system, the complete message can be identified as being wholly received when an end of message code is included.

Success of the scan line compression technique is determined in part by the decoding manipulation used to recreate the "skipped" lines of text/graphic message received. The following rules govern the recreation rules of a scan line compressed message by a selective call receiver or device having such inherent or adapted capabilities.

Figure 8:
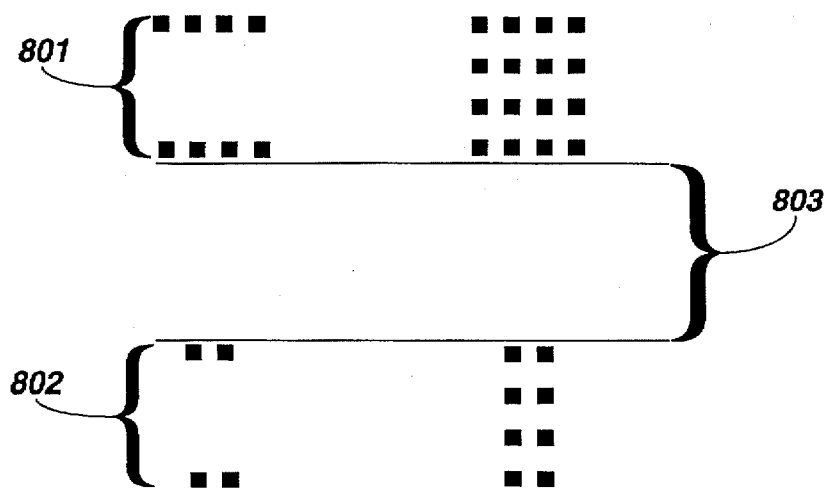
FIG. 8 illustrates the fill-in associated with a linear vertical scan line compression decoding operation for the case where R=2.

Referring to FIG. 8, the illustration 800 shows two examples of received text or graphics blocks 801, 802 (denoted "as transmitted" on the left and "as decoded" on the right) as partitions separated by identified empty white space between the partitions 803. In this example, the vertical space between parallel scan lines is linearly filled in where the R=2 lines were skipped. For illustration purposes, the transmitted and decoded data are shown next to each other.

In reality, this situation would not occur since the as transmitted data is typically buffered in memory until reconstruction is complete. Note that according to the first rule of reconstruction, the spaces with vertically aligned pels are filled, thus reconstructing the two deleted scan lines in this example.

Figure 9:
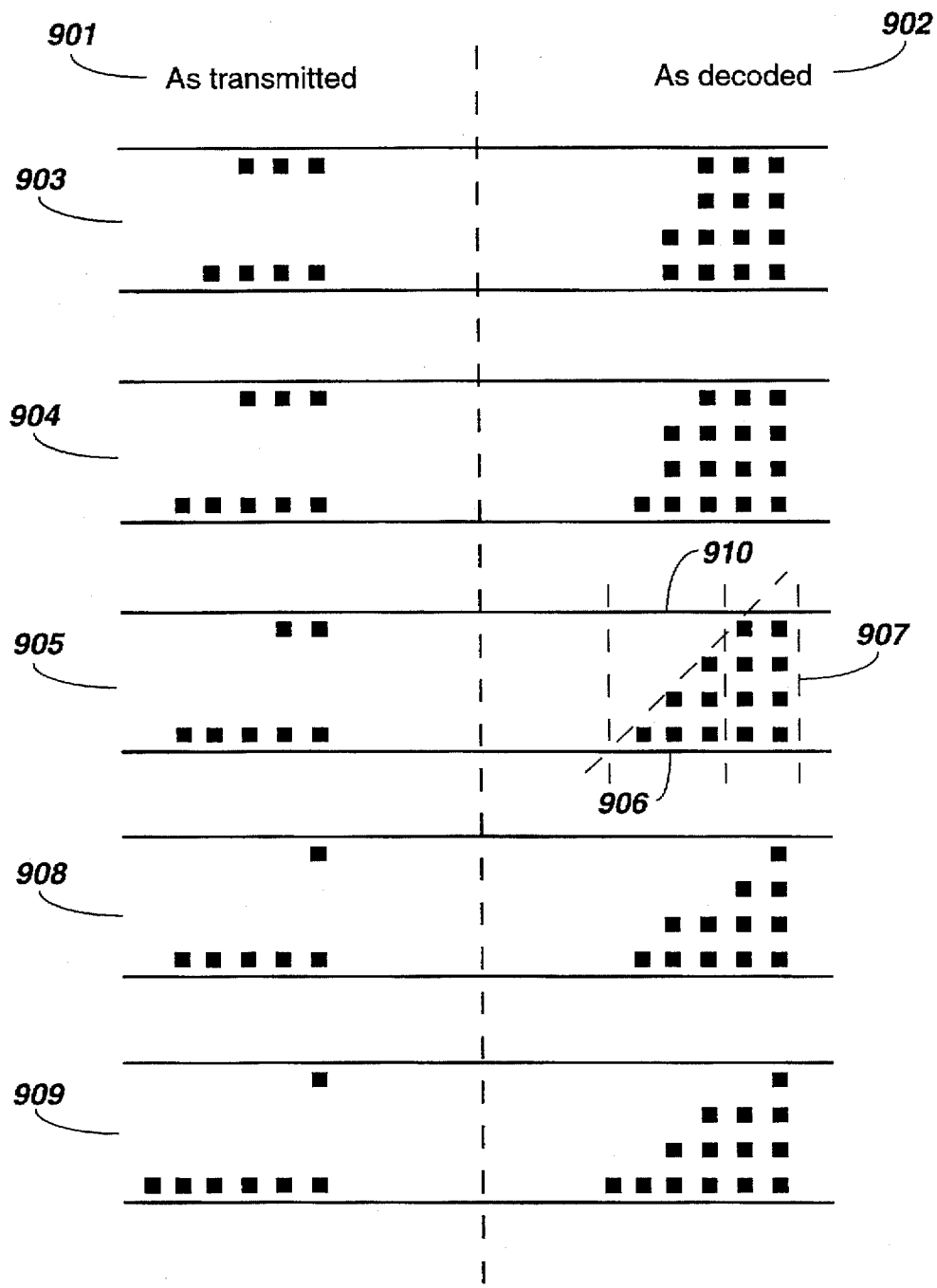
FIG. 9 illustrates the fill-in associated with a triangular vertical scan line compression decoding operation for the case where R=2.

Referring to FIG. 9, the illustration shows scan line compressed data with horizontal gaps between scan points located on adjacent transmitted scan lines. For those areas of the text/graphics which have horizontal gap separations in the vertical dimension for a defined partition (as transmitted column to the left) 901, an open space analysis plan will be followed, to reconstruct the "lost" data. Note that for the sake of simplicity, this example covers the case where R=2. This procedure can be extended to any number greater than 2. Column two in the illustration shows the "filled-in" decoded message 902.

The first row 903 illustrates the case where the lower scan line (or reference scan line) has 4 pels and the upper scan line (or adjacent scan line) has 3 pels, right aligned. As before, according to the first rule of reconstruction, the spaces with vertically aligned pels are filled first. Next, a second rule of reconstruction is applied to determine the addition of any remaining pels needed to make the reconstruction legible. The second rule of reconstruction essentially follows an open space plan that triangulates the region in which horizontal gaps appear between the reference and adjacent scan lines. This procedure will be more fully discussed later.

The second row 904 illustrates the case where the lower scan line has 5 pels and the upper scan line has 3 pels, right aligned. Again, the decoded data is generated according to the first and second rules of reconstruction.

The third row 905 illustrates the case where the lower scan line has 5 pels and the upper scan line has 2 pels, right aligned. Note that the fill area 906 outside of the area containing the two vertically aligned pels 907 exhibits a strong triangular shape.

Additional examples are presented in the fourth 908 and fifth 909 rows, both showing the fill characteristics associated with the first two rules of reconstruction.

Accordingly, the "filled-in" pel count will again equal the total of the horizontal gap ledge or the (total+1) depending on the particular width number under reconstruction. The procedures discussed in reference to FIGS. 8–11 are preferably implemented as part of the scan line compression decoding routine in the selective call receiver.

In the preceding examples, the decoding manipulation activity within the selective call receiver effectively triangulates the open space to recreate the message's original information content. This simple, but exact process allows the scan line compression operation to successfully achieve high compression ratios, while maintaining character and graphic shape legibility.

Figure 11:
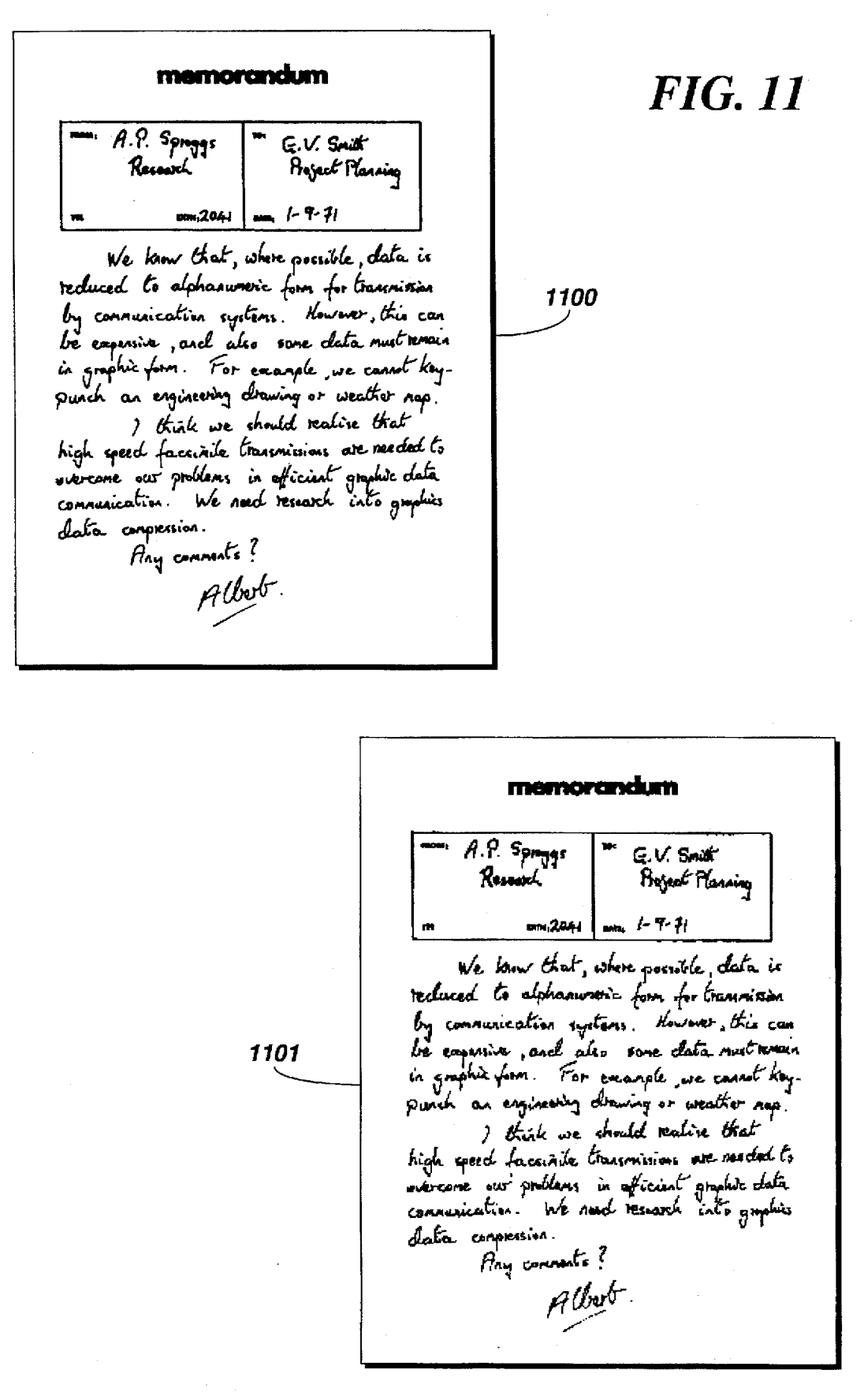

In summary, when a horizontal gap exists between the number of pels represented on a reference scan line and an adjacent scan line to which a fill operation is being attempted, vertical gaps with common neighbors are filled first. Next, if the number of pels on the reference scan line is greater than or equal to twice the number of pels in the adjacent scan line, only those regions having pels in direct vertical alignment are filled. In the intermediate case where no direct vertical gap exists between a pel on the reference scan line and the adjacent scan line, the horizontal difference between the last 2 vertically aligned pels is computed and a pseudo-linear fill is performed, effectively triangulating the points between the last vertically aligned pels and the last horizontal pel on either the reference or adjacent line. Note that this pseudo-linear fill is only performed if the number of pels on the reference scan line is less than twice the number of pels in the adjacent scan line. This first order linear approximation yields acceptable fill results with complex data such as Arabic typography, Kanji characters, or intricate graphics. However, when applied to handwritten text, the results (as shown in FIG. 11) are better than other data reduction processes (e.g., linear or bi-cubic mapping).

Figure 10:
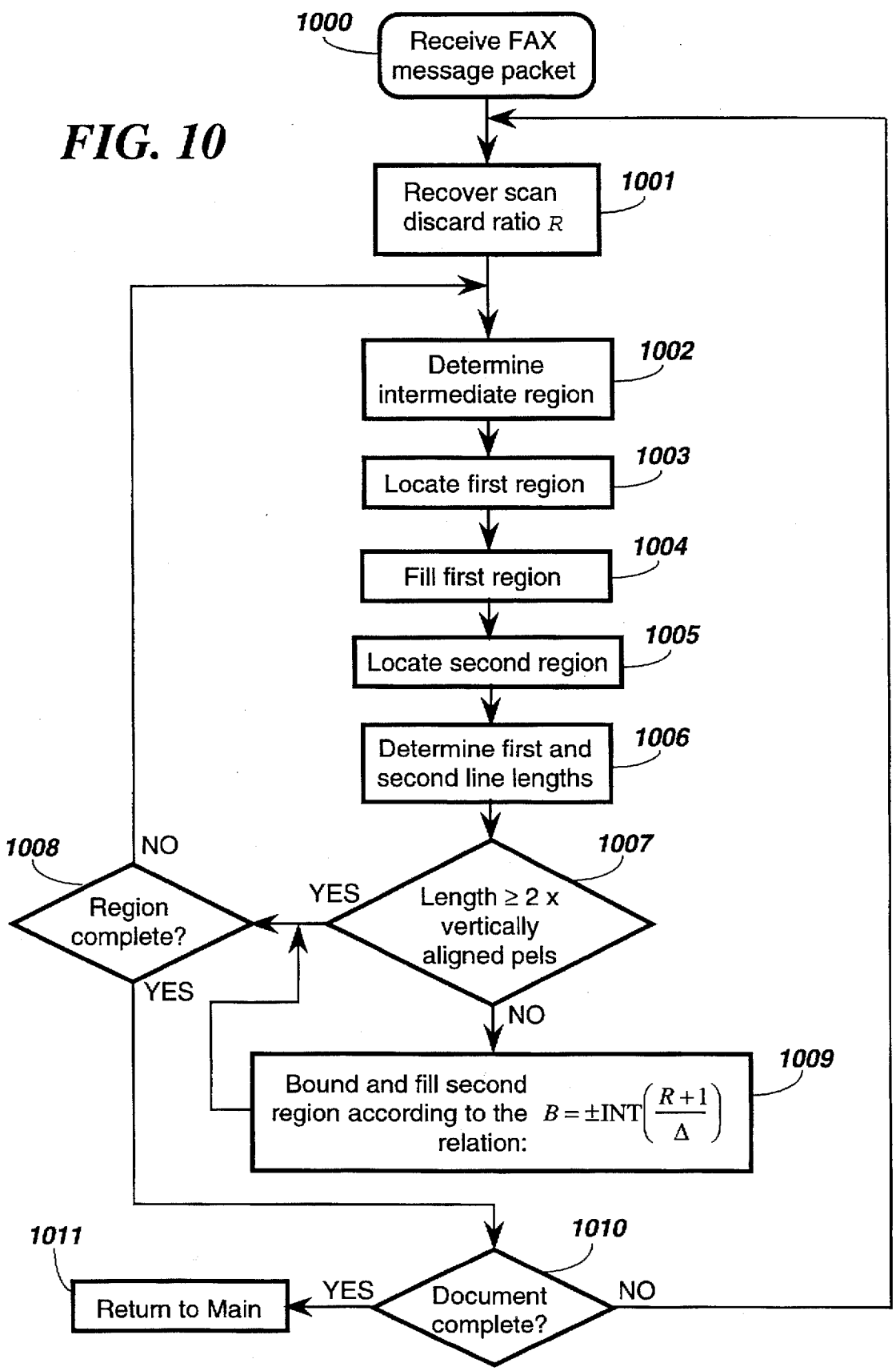
FIG. 10 is a flow diagram illustrating a procedure for decoding and reconstructing a compressed facsimile message of a quantized image of a source document in accordance with the preferred embodiment of the present invention.

Referring to FIG. 10, the flow diagram illustrates a procedure for decoding and reconstructing a compressed facsimile message of a quantized image of a source document in accordance with the preferred embodiment of the present invention.

After receipt of a FAX paging message packet 1000 as shown in FIG. 7, the scan line compressed facsimile message is decoded to recover a scan discard ratio R corresponding with at least one of at least first and second information regions contained in the compressed facsimile message is recovered 1001. Next, to effectively reconstruct the original source document, an intermediate processing region is determined based on a reference scan line having a shift in information content from a first state to a second state, and then back to the first state 1002. As one of ordinary skill in the art would recognize, the first and second states typically correspond with white and black, or vice-versa. Using the intermediate processing region as a basis, the at least one first region is located 1003 residing in at least a first area 907 having vertically aligned pels between a reference scan line and an adjacent scan line. This area 907 is vertically bounded by scan lines having common neighbors, e.g., common vertically aligned pels on the reference and adjacent scan lines as shown in the third region of FIG. 9 907.

After determining the at least one first region, the discarded or lost pels residing in the at least one first region are linearly filled with information corresponding with at least one of at least first and second information regions contained in the compressed facsimile message 1004. This is the first rule of reconstruction. In the prior examples, the information corresponds with black or dark pels. However, there is no reason why this procedure could not be applied to an inverse situation, e.g., white or light pels on a black or dark background. Moreover, the first and second information regions may be associated with the first and second states, e.g., as regions containing white and black or vice-versa.

Using the intermediate processing region as a further basis, the at least one second region is located 1005. The second region occupies at least one area 910 between the shift in information not in common with the at least one first region having vertically aligned pels between the reference scan line and the adjacent scan line. More simply, the at least one second region resides in a portion of the intermediate processing region where a vertical gap exists between pels on the reference and adjacent scan lines.

After locating the least one second region, a first length in pels, of the reference scan line corresponding with the intermediate processing region, and a second length in pels, of the adjacent scan line, are determined 1006.

If the greater of the first or second length in pels are greater than or equal to twice the number of pels in direct vertical alignment between the reference scan line and the adjacent scan line 1007, no fill operation is performed, and processing continues to the next portion of the scan line 1008. An alternative statement of the preceding rule is, missing pels are added in the at least one second region between the reference scan line and the adjacent scan line lacking vertically aligned pels, only if a number of pels in direct vertical alignment between the reference scan line and the adjacent scan line is greater than or equal to twice an absolute difference between the first length and second length.

In all other cases not prohibited by the first rule, a second rule of reconstruction governs where the scan lines are reconstructed by triangulating an area of fill pels between the reference scan line and the adjacent scan line lacking vertically aligned pels. According to the second rule, a difference in pels Δ between an extreme point of the at least one second region and a nearest point of the at least one first region based on one of the reference scan line and the adjacent scan line is computed to determine the at least one second region between the reference scan line and the adjacent scan line lacking vertically aligned pels in which missing pels will be added. The area in which fill pels will be placed lies between the at least one second region between the reference scan line and the adjacent scan line lacking vertically aligned pels, and a nearest side of the at least one first region as bounded by a pseudo-linear relation:

$$B = \pm INT\left(\frac{R+1}{\Delta}\right).$$

The sign associated with the relation B is positive when one of the extreme point of the at least one second region is located on the reference scan line and the nearest side of the at least one first region is located right of the extreme point; or the extreme point of the at least one second region is located on the adjacent scan line and the nearest side of the at least one first region is located left of the extreme point. Conversely, the sign associated with the relation B is negative when one of the extreme point of the at least one second region is located on the adjacent scan line and the nearest side of the at least one first region is located right of the extreme point; or the extreme point of the at least one second region is located on the reference scan line and the nearest side of the at least one first region is located left of the extreme point.

Finally, missing pels are added in at least one second region between the reference scan line and the adjacent scan line lacking vertically aligned pels 1009. The filling and adding steps are repeated until all discarded scan lines in the at least one of the at least first and second information regions are reconstructed 1008. Furthermore, the recovering, filling, and adding steps are repeated until all discarded scan lines in each of the at least one of the at least first and second information regions are reconstructed, resulting in a received facsimile message that substantially resembles the source document 1010. When reconstruction is complete, control is returned to the main processing program or routine 1011.

Referring to FIG. 11, the handwritten text shown is a portion of an original CCITT standard test document compressed using the lossless Group III method 1100. The original test document had an image content of 473,280 pels (910 horizontal by 510 vertical) sampled at approximately 80 pels per centimeter. Note the legibility of this handwritten note is good throughout its body, as expected for a high resolution fax message. However, the message shown, once quantized by a conventional fax processor using Group III standards, yielded a data size of over 24 Kbytes, giving an effective compression ratio of approximately 2.4:1.

The safe handwritten text shown in the first image 1100 was compressed using the scan line compression procedure, at a line skip rate of ⅔ (skip two out of every three quantized lines) 1101. In order to effectuate a valid comparison between the prior group III compressed image and the scan line compressed image, both images 1100, 1101 have been rendered at the same vertical and horizontal resolutions. Note that although two-thirds of the original data has been discarded from the second image 1101, the legibility of this handwritten note remains good. Using scan line compression techniques, the message shown 1101 yielded a data size of only 8 Kbytes, giving an effective compression ratio of approximately 6.6:1. In this example, an improvement of 275% is achieved without significant loss of readability. Ultimately, the scan line compressed message will transmit in approximately one-third the time required for the conventional Group III compressed message.

In practice, the scan line compression method will always achieve superior compression results as compared to conventional facsimile standards. This is particularly true when dealing with handwritten notes as presented above, since their text is generally larger height-wise compared to typed text.

What is claimed is:

1. A method for generating a scan line compressed facsimile message of a quantized image of a source document comprising the steps of:

analyzing the quantized image to locate at least first and second information regions;

determining a height in scan lines of each of the at least first and second information regions;

calculating a scan discard ratio R:1 for at least one of the at least first and second information regions, the scan discard ratio R:1 being a function of at least a vertical dimension limit Y that is a product of a vertical line density associated with the source document and a system loading factor f, and the height in scan lines corresponding with the at least one of the first and second information regions; and discarding R scan lines in the at least one of the first and second information regions.

2. The method according to claim 1 wherein the at least first and second information regions correspond to black major and white major regions, respectively.

3. The method according to claim 2 comprising the steps of:

analyzing the quantized image to determine a ratio between the black major and white major regions;

rotating the quantized image of the source document until the ratio between the black and white major regions is maximized, resulting in an optimally rotated image of the source document; and saving a rotation factor corresponding with an angle of rotation associated with the optimally rotated image of the source document.

4. The method according to claim 3 further comprising the step of:

storing the optimally rotated image of the source document in a scan line memory for improved processing by the determining, calculating, and discarding steps.

5. The method according to claim 3 further comprising the step of:

compressing one of the black major or white major regions containing like data using a run-length procedure.

6. The method according to claim 1 wherein the scan discard ratio R is calculated as:

$$R = INT\left(\frac{l_n}{Y}\right) - 1 \text{ lines,}$$

$R \geq 0$, where: $l_n$ is the height in scan lines of the at least one of the first and second information regions and Y is a vertical dimension limit.

7. The method according to claim 1 further comprising the steps of:

determining an average height $l_{avg}$ for regions corresponding in character with the at least one of the first and second information regions;

determining a density factor $DF_n$ for the at least one of the first and second information regions; and determining a normalized density factor $DF_{eff}$ for regions corresponding in character with the at least one of the first and second information regions.

8. The method according to claim 7 wherein the density factor $DF_n$ representing a quantized information content of the at least one of the first and second information regions is calculated as:

$$DF_n = \sum_{j=1}^{k} D_j,$$

where: k is a total number of sub-regions in the at least one of the first and second information regions, j is an increment variable, and $D_j$ represents a jth sub-region in the at least one of the first and second information regions.

9. The method according to claim 8 wherein the normalized density factor $DF_{eff}$ representing a normalized quantized information content of regions corresponding in character with the at least one of the first and second information regions is calculated as:

$$DF_{eff} = l_{avg} \sum_{n=1}^{m} \frac{DF_n}{l_n},$$

where: m is a total number of regions corresponding in character with the at least one of the first and second information regions.

10. The method according to claim 9 comprising the step of:

selecting a standard coding procedure when the normalized density factor $DF_{eff}$ does not exceed a predetermined threshold.

11. The method according to claim 10 wherein the standard coding procedure comprises the calculating and discarding steps.

12. The method according to claim 9 comprising the step of:

selecting an alternate coding procedure when the normalized density factor $DF_{eff}$ exceeds a predetermined threshold.

13. The method according to claim 12 wherein the alternate coding procedure comprises the calculating and discarding steps, and further comprises the step of:

preprocessing all horizontal lines to be a minimum of $(l_{avg}-1)/5$ pels wide and a minimum of $(l_{avg}-1)/2$ pels above and below each horizontal line.

14. The method according to claim 1 comprising the step of:

assembling a scan line compressed document for transmission, the scan line compressed document comprising a selective call address, an optional message header, a data block, and an optional end of message flag.

15. The method according to claim 14 wherein the optional message header comprises a optional facsimile protocol identifier, an optional data format type identifier, an optional encryption type identifier, a optional data block length, an optional source document origination identifier, an optional rotation factor, and an optional source document dispatch time stamp.

16. The method according to claim 14 wherein the data block comprises a serially interleaved scan line compressed facsimile message formatted to allow serial reconstruction of the scan line compressed document.

17. The method according to claim 14 wherein the data block comprises an overlap interleaved scan line compressed facsimile message formatted to allow reconstruction of the scan line compressed document in several interleaved scans, where each interleaved scan represents a portion of a reconstructed image occupying at least an image outline proportional to the source document.

18. A method for reconstructing a scan line compressed facsimile message of a quantized image of a source document comprising the steps of:

recovering a scan discard ratio R corresponding with at least one of at least first and second information regions contained in the compressed facsimile message;

filling at least one first region with information corresponding with at least one of at least first and second information regions contained in the compressed facsimile message, the at least one first region residing in at least a first area having vertically aligned pels between a reference scan line and an adjacent scan line;

adding missing pels in at least one second region between the reference scan line and the adjacent scan line lacking vertically aligned pels; and repeating the filling and adding steps until all discarded scan lines in the at least one of the at least first and second information regions are reconstructed.

19. The method according to claim 18 to further comprising the step of:

repeating the recovering, filling, and adding steps until all discarded scan lines in each of the at least one of the at least first and second information regions are reconstructed, resulting in a received facsimile message that substantially resembles the source document.

20. The method according to claim 18 further comprising the step of:

determining an intermediate processing region based on the reference scan line having a shift in information content from a first state to a second state, and then back to the first state; and locating the at least one second region based on the intermediate processing region, the at least one second region occupying at least one area between the shift in information not in common with the at least one first region having vertically aligned pels between the reference scan line and the adjacent scan line.

21. The method according to claim 20 wherein the first state corresponds to white and the second state corresponds to black.

22. The method according to claim 20 wherein the first state corresponds to black and the second state corresponds to white.

23. The method according to claim 20 wherein the adding step further comprising the steps of:

determining a first length in pels of the reference scan line corresponding with the intermediate processing region and a second length in pels of the adjacent scan line; and adding missing pels in the at least one second region between the reference scan line and the adjacent scan line lacking vertically aligned pels only if a number of pels in direct vertical alignment between the reference scan line and the adjacent scan line is greater than or equal to twice an absolute difference between the first length and second length.

24. The method according to claim 23 wherein the adding step further comprising the steps of:

triangulating an area of fill pels between the reference scan line and the adjacent scan line lacking vertically aligned pels by:

computing an difference in pels Δ between an extreme point of the at least one second region and a nearest point of the at least one first region based on one of the reference scan line and the adjacent scan line; and adding missing pels in the at least one second region between the reference scan line and the adjacent scan line lacking vertically aligned pels, and a nearest side of the at least one first region as bounded by a pseudo-linear relation $$B = \pm INT\left(\frac{R+1}{\Delta}\right).$$

25. The method according to claim 24 wherein a sign of B is positive when one of:

the extreme point of the at least one second region is located on the reference scan line and the nearest side of the at least one first region is located right of the extreme point; and the extreme point of the at least one second region is located on the adjacent scan line and the nearest side of the at least one first region is located left of the extreme point.

26. The method according to claim 24 wherein a sign of B is negative when one of:

the extreme point of the at least one second region is located on the adjacent scan line and the nearest side of the at least one first region is located right of the extreme point; and the extreme point of the at least one second region is located on the reference scan line and the nearest side of the at least one first region is located left of the extreme point.

27. The method according to claim 18 further comprising the step of:

recovering a rotation factor; and rotating the compressed facsimile message to an angle inverse to a rotation factor determined by maximizing a ratio between black and white major regions.

28. The method according to claim 18 comprising the step of:

receiving a scan line compressed document, the scan line compressed document comprising a selective call address, an optional message header, a data block, and an optional end of message flag.

29. The method according to claim 28 wherein the optional message header comprises a optional facsimile protocol identifier, an optional data format type identifier, an optional encryption type identifier, a optional data block length, an optional source document origination identifier, an optional rotation factor, and an optional source document dispatch time stamp.

30. The method according to claim 28 wherein the data block comprises a serially interleaved scan line compressed facsimile message formatted to allow serial reconstruction of the scan line compressed document.

31. The method according to claim 28 wherein the data block comprises an overlap interleaved scan line compressed facsimile message formatted to allow reconstruction of the scan line compressed document in several interleaved scans, where each interleaved scan represents a portion of a reconstructed image occupying at least an image outline proportional to the source document.

32. A communication controller that generates a scan line compressed facsimile message of a quantized image of a source document for transmission in a selective call facsimile system, comprising:

a compression processor that assembles a scan line compressed document, the scan line compressor operating to analyze the quantized image to locate at least first and second information regions, determine a white space ratio between the at least first and second information regions, rotate the quantized image of the source document until the white space ratio between the at least first and second information regions is maximized, resulting in an optimally rotated image of the source document, save a rotation factor corresponding with an angle of rotation associated with the optimally rotated image of the source document, determine a height in scan lines of each of the at least first and second information regions in the optimally rotated image of the source document, calculate a scan discard ratio R:1 for at least one of the at least first and second information regions; and discard R:1 scan lines in the at least one of the first and second information regions.

33. The communication controller according to claim 32 further comprising:

a scan line memory for storing the optimally rotated image of the source document.

34. The communication controller according to claim 32 further comprising a network interface for communicating with machines that generate facsimile messages.

35. The communication controller according to claim 34 wherein the network interface allows communication over a public switched telephone network.

36. The communication controller according to claim 34 wherein the network interface allows communication over a integrated services digital network.

37. The communication controller according to claim 34 wherein the network interface allows communication over a high speed wide area network.

38. The communication controller according to claim 34 wherein the network interface allows communication over a high speed local area network.

39. The communication controller according to claim 34 wherein the network interface allows communication over a wireless network.

40. The communication controller according to claim 32 further comprising:

a selective call message controller that governs receipt and transmission of at least one selective call message to at least one selective call messaging receiver.

41. The communication controller according to claim 40 wherein the at least one selective call message comprises a selective call address, an optional message header, a data block, and an optional end of message flag.

42. The communication controller according to claim 41 wherein the optional message header comprises a optional facsimile protocol identifier, an optional data format type identifier, an optional encryption type identifier, a optional data block length, an optional source document origination identifier, an optional rotation factor, and an optional source document dispatch time stamp.

43. The communication controller according to claim 41 wherein the data block comprises a serially interleaved scan line compressed facsimile message formatted to allow serial reconstruction of the scan line compressed document.

44. The communication controller according to claim 41 wherein the data block comprises an overlap interleaved scan line compressed facsimile message formatted to allow reconstruction of the scan line compressed document in several interleaved scans, where each interleaved scan represents a portion of a reconstructed image occupying at least an image outline proportional to the source document.

45. The communication controller according to claim 32 further comprising a base station control link for governing operation of a radio frequency base station that transmits selective call messaging comprising the scan line compressed document.

46. A selective call receiver for receiving a scan line compressed facsimile message, comprising:

a receiver that receives a selective call message comprising a scan line compressed document; and a scan line compressed facsimile decoder that decodes the scan line compressed document for presentation, the scan line compressed facsimile decoder operating to recover a scan discard ratio R corresponding with at least one of at least first and second information regions contained in the compressed facsimile message; fill at least one first region with information corresponding with at least one of at least first and second information regions contained in the compressed facsimile message, the at least one first region residing in at least a first area having vertically aligned pels between a reference scan line and an adjacent scan line; add missing pels in at least one second region between the reference scan line and the adjacent scan line lacking vertically aligned pels; and repeat the fill and add operations until discarded scan lines in the at least one of the at least first and second information regions are reconstructed.

47. The selective call receiver according to claim 46 wherein the scan line compressed facsimile decoder is implemented as software that executes in a processor.

48. The selective call receiver according to claim 47 wherein the processor comprises a microcomputer coupled to a non-volatile memory containing instructions executed by the microcomputer to effect decoding of the scan line compressed document.

49. The selective call receiver according to claim 46 wherein the scan line compressed facsimile decoder is implemented as hardware embodied in a processor.

50. The selective call receiver according to claim 46 wherein the scan line compressed document is stored in a message memory for recall and presentation.

51. The selective call receiver according to claim 50 wherein the message memory is accessible by a peripheral device external to the selective call receiver for transfer of the scan line compressed document.

52. The selective call receiver according to claim 46 wherein the scan line compressed facsimile decoder operates to decode a serially interleaved scan line compressed facsimile message.

53. The selective call receiver according to claim 46 wherein the scan line compressed facsimile decoder operates to decode an overlap interleaved scan line compressed facsimile message.

54. The selective call receiver according to claim 46 comprising:

a display for presenting the scan line compressed document in at least one of a serial interleave and an overlap interleave format.

* * * * *